Oct. 7, 1930.  L. DE FOREST  1,777,828
SOUND PICTURE PHOTOGRAPHY
Filed Nov. 29, 1924
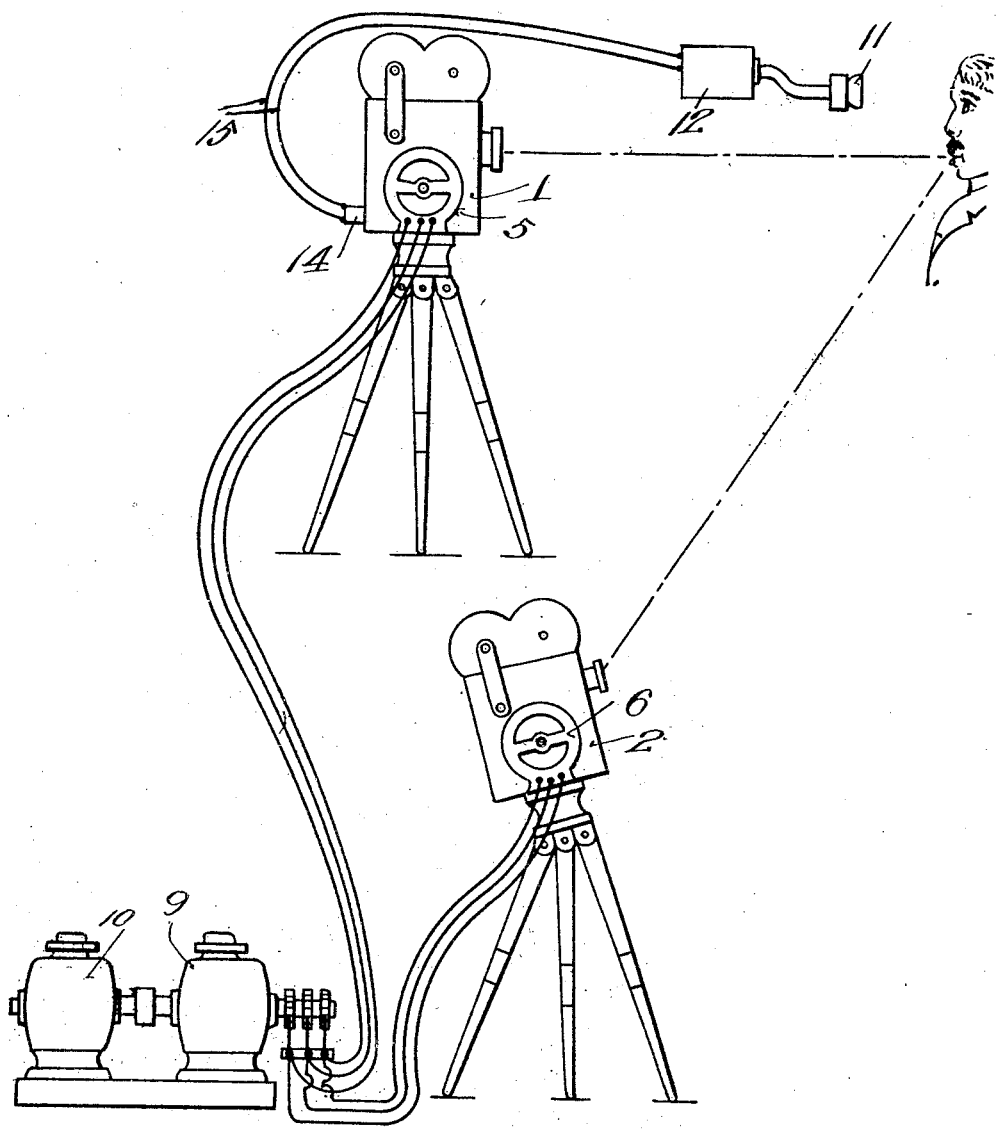

Patented Oct. 7, 1930

1,777,828

UNITED STATES PATENT OFFICE

LEE DE FOREST, OF NEW YORK, N. Y., ASSIGNOR, BY MESNE ASSIGNMENTS, TO GENERAL TALKING PICTURES CORPORATION, A CORPORATION OF DELAWARE

SOUND-PICTURE PHOTOGRAPHY

Application filed November 29, 1924. Serial No. 752,840.

This invention relates to sound picture photography and has for its object the provision of means for enabling shift of distance of the picture camera from the object being photographed without interfering with the continuity of the sound record, and vice versa, and at the same time permits the sound volume to be controlled in accordance with said shift.

Other objects of the invention will appear more fully hereinafter.

The invention consists substantially in the construction, combination, location and relative arrangement of parts, all as will be more fully hereinafter set forth, as shown in the accompanying drawing and finally pointed out in the appended claim.

Referring to the drawing:

The figure is a diagrammatic view illustrating the principles of my invention.

In simultaneously photographically recording sound and picture by the phonofilm method, it is frequently desirable to change suddenly from a "long shot" of the object (i. e., the camera located at a comparatively great distance from the object) to a "closeup" of the same without in any way or for even a fraction of a second interrupting either the action or the sound record. If one camera only is used, it is necessary to rapidly move the same closer to the object, and vice versa, in changing from a closeup to a long shot, or to change the lenses. This unavoidably introduces serious difficulties or delays in either recording continuity of action or sound record.

It is among the special purpose of my present invention to obviate these drawbacks, and to do so, I employ two cameras each perfectly synchronized with the other as to film and speed, and I record the sound on the film of either one or the other, or both cameras. One camera is located relatively far from the object for the long shot view. The other is so located or employs a closeup lens so as to photograph the closeup view of the object. The two negatives obtained are then developed and a print is made on a positive film using alternately such portions of a long shot and a close up negative as may be desired, but preferably printing the sound record from one of the two negatives only, because ordinarily it is quite sufficient to record the sound in one of the two cameras only, where, however, it is desired to control the volume in accordance with the shifting of the distance from which the picture is taken, the sound record may likewise be recorded from either of the two cameras. However, I do not desire to be limited or restricted in this respect as my invention in its widest application, applies to motion picture photography offered in connection with or independently of sound picture photography.

Although, it is possible to mechanically couple up the two cameras, it is quite essential, in order to preserve continuity and speed, that the two should be free to be located independently of each other. Therefore, I prefer to drive each camera in synchronism by means of identical alternating current motors, single or polyphase, both driven from a common generator.

In the drawing illustrating the invention, 1 and 2 designate the two cameras which, preferably, are of identical construction and are operated by the motors 5 and 6 which obtain their current from the generator 9 which may be driven by motor 10. This motor is preferably driven by a storage battery giving absolutely constant speed to the generator, and, hence, to both cameras. Only one of the two cameras, namely 1, is shown equipped with a sound photographing equipment consisting of the microphone 11 which is connected to an amplifier of any suitable construction, diagrammatically illustrated at 12, which in turn controls the photion lamp diagrammatically illustrated at 14 by the conductors 15 in the usual well-known manner. I wish it to be understood, however, that I do not desire to be limited or restricted to any particular type of equipment employed, as it is the general means developed for overcoming the difficulty in the art of motion and/or sound picture photography which forms the subject-matter of my present invention.

Having now set forth the objects of my invention, and having shown and described an arrangement embodying the principles thereof, what I claim as new and useful and of my own invention, and desire to secure by Letters Patent is:

The method of making continuous photographic sound and picture records of the same scene, which comprises employing a plurality of cameras at different focal distances from the scene, driving the cameras in synchronism, continuously photographically recording the sounds originating in the scene, photographically recording the scene by the cameras, and printing on a single positive film the desired portions of the films of the different cameras including the sound record to obtain a continuous sound and picture record.

In testimony whereof I have hereunto set my hand on this 22d day of November, A. D. 1924.

LEE DE FOREST.